United States Patent
Kim et al.

(10) Patent No.: US 8,996,272 B2
(45) Date of Patent: Mar. 31, 2015

(54) CRUISE CONTROL SYSTEM AND METHOD THEREOF

(75) Inventors: Do Hyun Kim, Daejeon (KR); Jungsook Kim, Daejeon (KR); Jae Han Lim, Daejeon (KR); Kyeong Tae Kim, Chuncheon-si (KR); Byung Tae Jang, Daejeon (KR); Jeong Dan Choi, Daejeon (KR); Jaejun Yoo, Daejeon (KR); Kyung Bok Sung, Daejeon (KR); Jeong Ah Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1311 days.

(21) Appl. No.: 12/565,898

(22) Filed: Sep. 24, 2009

(65) Prior Publication Data

US 2010/0138100 A1    Jun. 3, 2010

(30) Foreign Application Priority Data

Dec. 3, 2008 (KR) .......................... 10-2008-0121997

(51) Int. Cl.
B60T 8/32 (2006.01)
G06F 17/00 (2006.01)
B60W 30/14 (2006.01)

(52) U.S. Cl.
CPC .................................. B60W 30/14 (2013.01)
USPC .................. 701/93; 701/70; 701/96; 180/170

(58) Field of Classification Search
USPC .................................. 701/70, 93, 96; 180/170
See application file for complete search history.

(56) References Cited

U.S. PATENT DOCUMENTS

| 5,058,698 A | 10/1991 | Yoshida et al. |
| 5,901,806 A * | 5/1999 | Takahashi ...................... 180/170 |
| 6,360,158 B1 * | 3/2002 | Hanawa et al. ................. 701/93 |
| 6,396,417 B2 | 5/2002 | Lee |
| 6,580,984 B2 * | 6/2003 | Fecher et al. ................... 701/36 |
| 7,440,835 B2 | 10/2008 | Shima |
| 7,460,946 B2 | 12/2008 | Shima |
| 8,155,868 B1 * | 4/2012 | Xing et al. ..................... 701/123 |
| 2003/0050740 A1 * | 3/2003 | Fecher et al. ..................... 701/1 |
| 2004/0068359 A1 * | 4/2004 | Neiss et al. ..................... 701/96 |
| 2004/0084237 A1 * | 5/2004 | Petrie, Jr. ....................... 180/170 |
| 2007/0112475 A1 * | 5/2007 | Koebler et al. ................... 701/1 |
| 2007/0276582 A1 * | 11/2007 | Coughlin ..................... 701/123 |
| 2009/0048746 A1 | 2/2009 | Kaigawa |
| 2011/0313647 A1 * | 12/2011 | Koebler et al. ............... 701/123 |
| 2012/0123657 A1 * | 5/2012 | Taguchi .......................... 701/93 |

FOREIGN PATENT DOCUMENTS

| JP | 7-186645 | 7/1995 |
| JP | 2002-24992 | 1/2002 |
| JP | 2006-6030 | 1/2006 |

(Continued)

*Primary Examiner* — Jack W Keith
*Assistant Examiner* — Chuong P Nguyen
(74) *Attorney, Agent, or Firm* — Staas & Halsey LLP (57) ABSTRACT

Provided is a cruise control system and method. A vehicle cruise control system collects state information of components inside and outside a vehicle, state information of a road on which the vehicle is provided, and drive pattern information of a driver of the vehicle, analyzes a mileage amount and an exhaust gas emission amount of the vehicle based on the collected state information of the components, the road state information, and the drive pattern information, calculates a cruise control speed based on the analysis result, and controls the vehicle to run at the cruise control speed.

14 Claims, 5 Drawing Sheets

(56) References Cited

FOREIGN PATENT DOCUMENTS

| JP | 2006-27456 | 2/2006 |
|----|------------|--------|
| JP | 2006-27457 | 2/2006 |
| JP | 2007-38933 | 2/2007 |
| KR | 10-0282744 | 4/2001 |
| KR | 2001-0056456 | 7/2001 |
| KR | 10-2007-0060568 | 6/2007 |
| KR | 10-2008-0023284 | 3/2008 |

\* cited by examiner

CRUISE CONTROL SYSTEM AND METHOD THEREOF

CROSS-REFERENCE TO RELATED APPLICATION

This application claims priority to and the benefit of Korean Patent Application No. 10-2008-0121997 filed in the Korean Intellectual Property Office on Dec. 3, 2008, the entire contents of which are incorporated herein by reference.

BACKGROUND OF THE INVENTION (a) Field of the Invention

The present invention relates to a cruise control system and a method thereof. Particularly, the present invention relates to a cruise control system and a method thereof for calculating an environmentally-friendly/economical drive speed while allowing cruise control.

(b) Description of the Related Art

A cruise control system allows a vehicle to run at a predetermined uniform speed when a driver starts a cruise control device at a specific speed. The system can reduce the driver's drive fatigue, but it does not provide safety and an environmentally-friendly and economical driving method because of driving patterns of other vehicles.

A safety component is added to the conventional cruise control system to generate an adaptive (or smart) cruise control system. The smart cruise control system adjusts the vehicle's speed to maintain a regular distance with a preceding vehicle in order to prevent a collision with it when it changes drive lanes or speed, and the system controls the vehicle to run at a steady speed when the distance is obtained.

However, since this skill allows a steady drive only based on the speed established by the driver, it has a problem of failing to provide environmentally-friendly and economical driving.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cruise control system and method thereof for controlling a user's vehicle to run at an environmentally-friendly and economical drive speed that is calculated by using vehicle drive information, driver drive information, and road information.

An exemplary embodiment of the present invention provides a cruise control method by a vehicle including: collecting state information of components inside and outside the vehicle, state information of the road on which the vehicle is provided, and drive pattern information of a driver of the vehicle; analyzing a mileage amount and an exhaust gas emission amount of the vehicle based on the collected state information of the components, the road state information, and the drive pattern information; and calculating a cruise control speed based on the analysis result and controlling the vehicle to run at the cruise control speed.

Another embodiment of the present invention provides a cruise control system including: a vehicle state information processing device for formalizing information of a vehicle's inner and outer components; a road state information processing device for formalizing information of a road on which the vehicle is provided; a drive pattern information processing device for formalizing drive information of the vehicle driver; an analyzing device for analyzing the vehicle's mileage amount and exhaust gas emission amount based on the formalized information; and a calculating device for calculating a cruise control speed based on the analysis result by the analyzing device and controlling the vehicle's ride based on the cruise control speed.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a cruise control system and a method thereof according to an exemplary embodiment of the present invention will be described in detail with reference to accompanying drawings.

Figure 1:
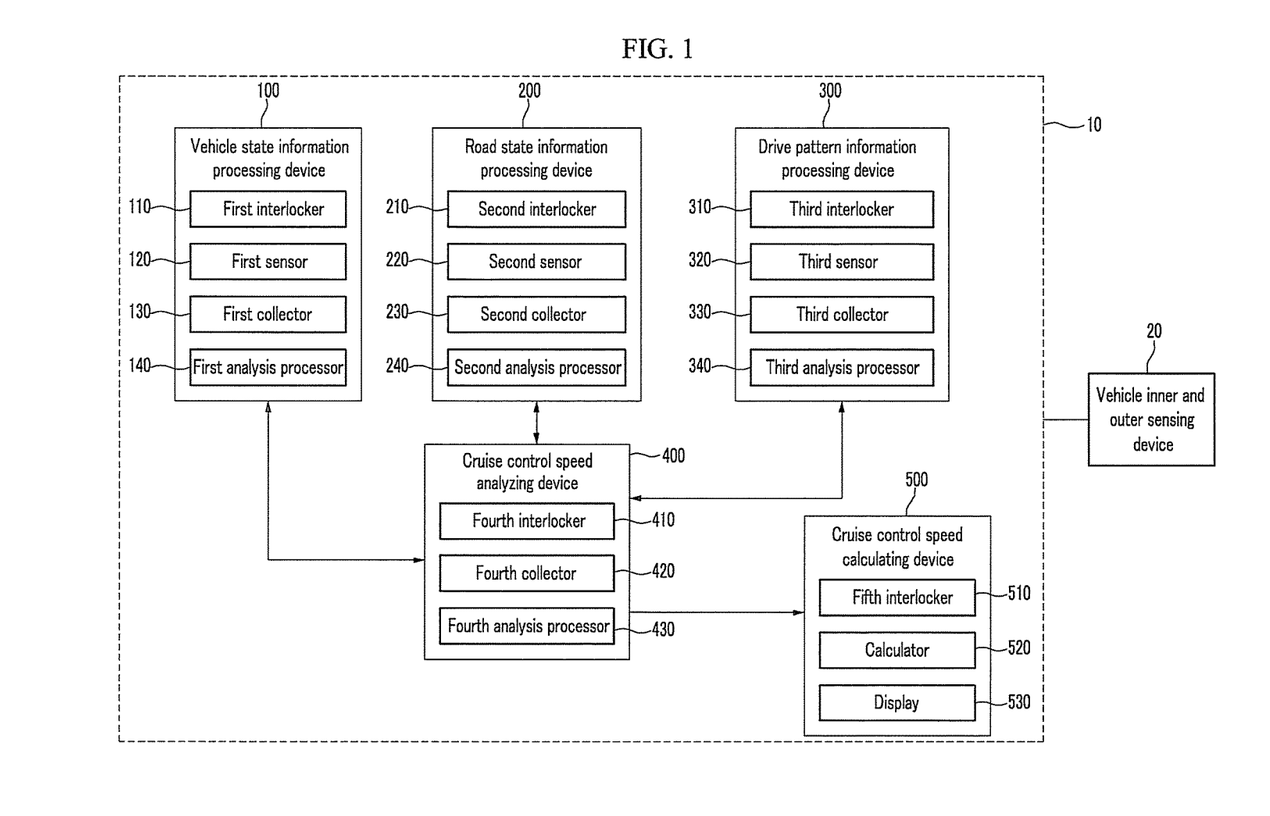
FIG. 1 shows a cruise control system according to an exemplary embodiment of the present invention.

FIG. 1 shows a cruise control system according to an exemplary embodiment of the present invention.

As shown in FIG. 1, the cruise control system 10 includes a vehicle state information processing device 100, a road state information processing device 200, a drive pattern processing device 300, an analyzing device 400, and a cruise control speed calculating device 500.

A vehicle inner and outer sensing device 20 is installed in/out of the vehicle, and is operable in interlock with the vehicle state information processing device 100, the road state information processing device 200, and the drive pattern processing device 300.

The vehicle state information processing device 100 includes a first interlocker 110, a first sensor 120, a first collector 130, and a first analysis processor 140.

The first interlocker 110 transmits/receives information to/from the vehicle inner and outer sensing device 20 in linkage with the cruise control speed analyzing device 400.

The first sensor 120 activates the vehicle inner and outer sensing device 20 to sense states of components inside/outside the vehicle. Here, the components inside/outside the vehicle include tires and engine oil.

The first collector 130 collects the sensing result of the first sensor 120, that is, state information of the components inside/outside the vehicle. For example, the first collector 130 collects state information on the components inside/outside the vehicle as expressed in Table 1.

TABLE 1

| Vehicle device and component info | Optimal states | Current states |
| --- | --- | --- |
| Tire | 36 psi | 31 psi |
| Engine oil | 100% | 80% |

As expressed in Table 1, the first collector 130 collects the result of sensing the current air pressure (psi) of the tire and the result of sensing the current engine oil amount of the vehicle.

The first analysis processor 140 analyzes state information of the components inside/outside the vehicle collected by the first collector 130 and converts it into a formalized pattern.

The road state information processing device 200 includes a second interlocker 210, a second sensor 220, a second collector 230, and a second analysis processor 240.

The second interlocker 210 transmits/receives information to/from the vehicle inner and outer sensing device 20 for sensing road information in linkage with the cruise control speed analyzing device 400.

The second sensor 220 activates the vehicle inner and outer sensing device 20 to sense the state of the road on which the vehicle is currently provided. The road state according to the exemplary embodiment of the present invention includes a green signal remaining time of a signal lamp on the road, and a road type.

The second collector 230 collects the sensing result by the second sensor 220, that is, road state information. For example, the second collector 230 collects road state information as expressed in Table 2.

TABLE 2

| Road information | States |
| --- | --- |
| Front crossroad green signal remaining time | 10 seconds |
| Front road type | 100 m uphill section |

As expressed in Table 2, the second collector 230 collects the remaining time of the green signal of the front crossroad on which a vehicle exists and the front road type.

The second analysis processor 240 analyzes the road state information collected by the second collector 230 and converts it into a formalized pattern.

The drive pattern information processing device 300 includes a third interlocker 310, a third sensor 320, a third collector 330, and a third analysis processor 340.

The third interlocker 310 transmits/receives information to/from the vehicle inner sensing device 20 for sensing the driver's drive pattern in linkage with the cruise control speed analyzing device 400.

The third sensor 320 activates the sensing device 20 inside/outside the vehicle to sense the driver's drive pattern information. Here, the drive pattern information includes information corresponding to the driver's actions during the drive, that is, the number of idling states and the number of acceleration and deceleration states.

The third collector 330 collects the result of sensing by the third sensor 320, that is, the driver's drive pattern information as a table shown in Table 3.

TABLE 3

| Driver's drive pattern information | States |
| --- | --- |
| Idling | 10 times |
| Acceleration and deceleration | 15 times |

As expressed in Table 3, the third collector 330 collects the number of idling states per time by the driver during a ride and the number of acceleration and deceleration states.

The third analysis processor 340 analyzes the road state information collected by the third collector 330.

The analyzing device 400 includes a fourth interlocker 410, a fourth collector 420, and a fourth analysis processor 430.

The fourth interlocker 410 receives information in linkage with the vehicle state information processing device 100, the road state information processing device 200, and the drive pattern information processing device 300.

The fourth collector 420 collects formalized vehicle component state information, road state information, and driver's drive pattern information.

The fourth analysis processor 430 analyzes how the collected information influences the vehicle mileage amount and the exhaust gas emission amount based on the information collected by the fourth collector 420. The analysis result of the fourth analysis processor 430 may be expressed as Table 4.

TABLE 4

| Synthesis analysis information | Mileage influence | Exhaust gas influence |
| --- | --- | --- |
| Tire | 10% | 10% |
| Engine oil | 40% | 10% |
| Front crossroad green signal remaining time | 20% | 5% |
| Front road type | 5% | 20% |
| Idling | 10% | 10% |
| Acceleration/deceleration | 10% | 10% |

The cruise control speed calculating device 500 includes a fifth interlocker 510, a calculator 520, and a display 530.

The fifth interlocker 510 receives the result analyzed by the analyzing device 400 in linkage with the analyzing device 400.

The calculator 520 calculates an environmentally-friendly cruise control speed based on the received analysis result.

After the cruise control speed is calculated, the cruise control system 10 controls the vehicle to run at the cruise control speed. The cruise control speed according to the exemplary embodiment of the present invention provides the highest mileage amount that is greater than the reference mileage amount and the lowest exhaust gas emission amount that is less than the reference exhaust gas emission amount according to the current vehicle's inner and outer component states, road state, and driver's drive pattern information.

Also, the display 530 provides the calculated cruise control speed to the user.

A cruise control method according to an exemplary embodiment of the present invention will now be described in detail with reference to FIG. 2.

Figure 2:
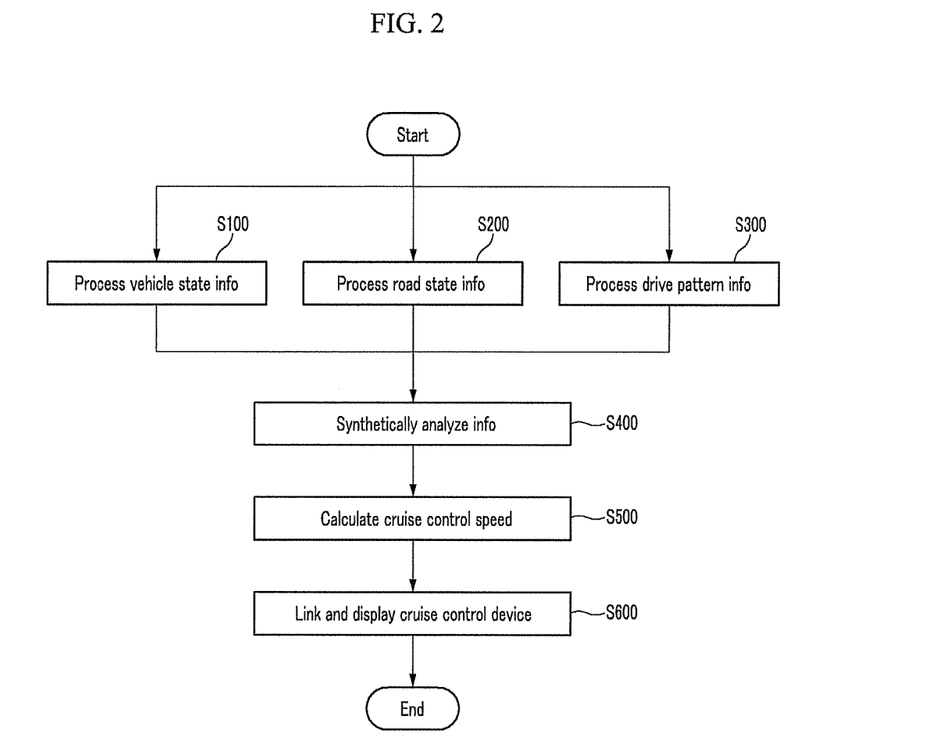
FIG. 2 shows a flowchart of a cruise control method according to an exemplary embodiment of the present invention.

FIG. 2 shows a flowchart of a cruise control method according to an exemplary embodiment of the present invention.

The cruise control system 10 analyzes the vehicle's inner and outer component states to generate formalized information (S100). Here, the vehicle's inner and outer component states include states of the tire and the engine oil.

Also, the cruise control system 10 analyzes road state information to generate formalized information (S200), and it analyzes the driver's drive pattern information to generate formalized information (S300). Here, the road state information includes a green signal remaining time of the signal lamp on the road and a road type, and the drive pattern information includes the number of idling states per time by the driver during a ride and the number of acceleration and deceleration states.

A detailed method for generating formalized information according to the exemplary embodiment of the present invention corresponding to the vehicle's inner and outer component states, road state information, and drive pattern information will be described in detail with reference to FIG. 3 to FIG. 5.

The cruise control system 10 synthetically analyzes the influence of the formalized information that is applicable to the vehicle's mileage and the influence thereof that is applicable to the exhaust gas emission by using formalized information respectively corresponding to the vehicle state information, the road state information, and the drive pattern information (S400).

The cruise control system 10 calculates the cruise control speed based on the analysis result (S500).

After the cruise control speed is calculated, the cruise control system provides the cruise control speed to the vehicle's user to control the vehicle to run at the cruise control speed (S600). The cruise control speed according to the exemplary embodiment of the present invention provides the greatest mileage amount that is greater than the reference mileage amount and the lowest exhaust gas emission amount that is less than the reference exhaust gas emission amount according to the current vehicle's inner and outer component states, road states, and driver's drive pattern information.

Further, the cruise control system 10 can share safety information including the cruise control speed with the cruise control device included to the vehicle.

The cruise control system according to the exemplary embodiment of the present invention is operable in linkage with the conventional cruise control device in the vehicle and it can be installed inside or outside the vehicle, but it is not restricted thereto.

A method for generating formalized information by analyzing vehicle state information in the cruise control method according to the exemplary embodiment of the present invention will now be described with reference to FIG. 3.

Figure 3:
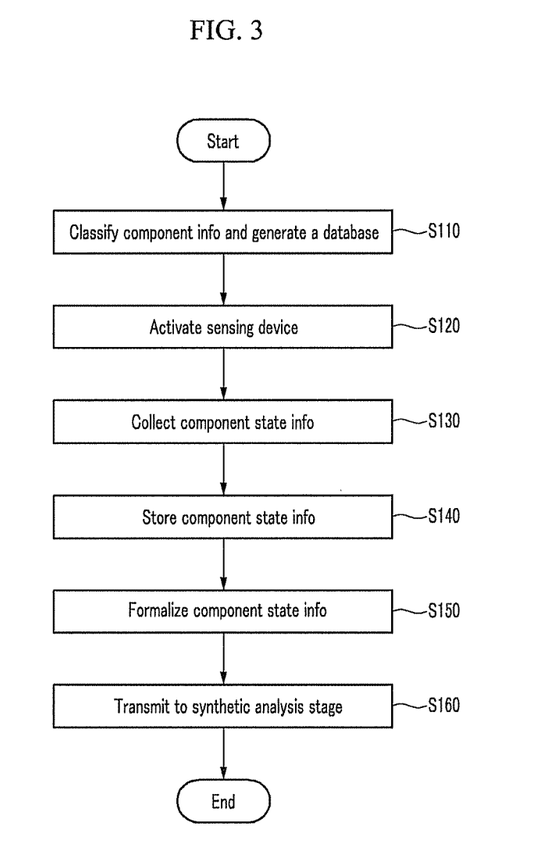
FIG. 3 shows a flowchart of a vehicle state information processing method according to an exemplary embodiment of the present invention.

FIG. 3 shows a flowchart of a vehicle state information processing method according to an exemplary embodiment of the present invention.

In the cruise control system 10, the vehicle state information processing device 100 classifies the vehicle's inner and outer components to store data including the components' characteristic and history information (S110). Also, the vehicle state information processing device 100 activates the sensing device 20 inside or outside the vehicle corresponding to the vehicle's inner and outer components (S120), and collects the result of sensing vehicle's inner and outer components, that is, the state information of the vehicle's inner and outer components, by using the activated sensing device 20 (S130).

The vehicle state information processing device 100 stores the collected state information of the vehicle's inner and outer components (S140), and converts the collected state information into a formalized format (S150).

The vehicle state information processing device 100 transmits the formalized information to the cruise control speed analyzing device 400 in order to synthetically analyze the same together with the formalized information respectively corresponding to the road state information and the drive pattern information (S160).

A method for generating formalized information by analyzing road state information in the cruise control method according to the exemplary embodiment of the present invention will now be described in detail with reference to FIG. 4.

Figure 4:
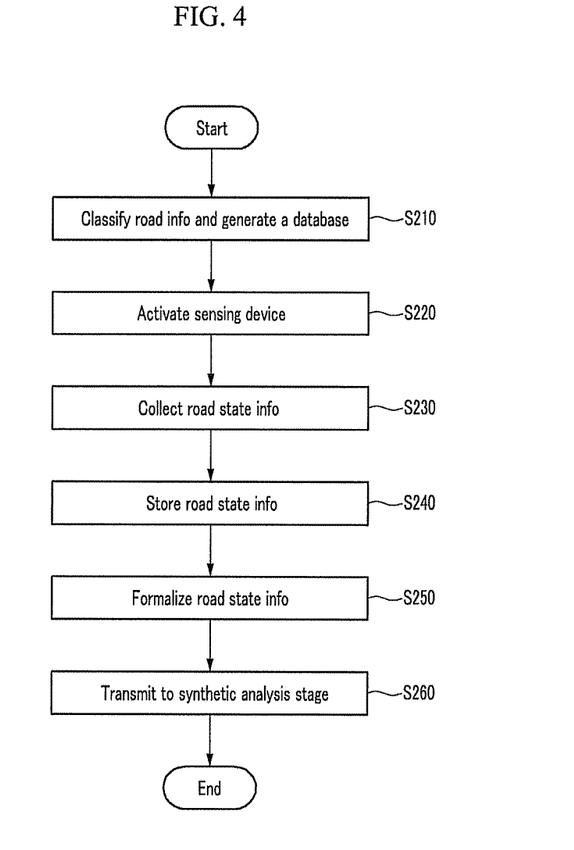
FIG. 4 shows a flowchart of a road state information processing method according to an exemplary embodiment of the present invention.

FIG. 4 shows a flowchart of a road state information processing method according to an exemplary embodiment of the present invention.

The road state information processing device 200 classifies road state information to store data including the road's characteristic and history information (S210). In addition, the road state information processing device 200 activates the sensing device 20 inside or outside the vehicle for sensing the road state (S220), and collects information of sensing the road state, that is, road state information, by using the activated sensing device 20 (S230).

The road state information processing device 200 stores the collected road state information (S240), and converts the road state information into a formalized format (S250).

The road state information processing device 200 transmits the formalized information to the cruise control speed analyzing device 400 in order to synthetically analyze it together with formalized information respectively corresponding to the vehicle's inner and outer component state information and drive pattern information (S260).

A method for generating formalized information by analyzing the driver's drive pattern information in the cruise control method according to the exemplary embodiment of the present invention will now be described in detail with reference to FIG. 5.

Figure 5:
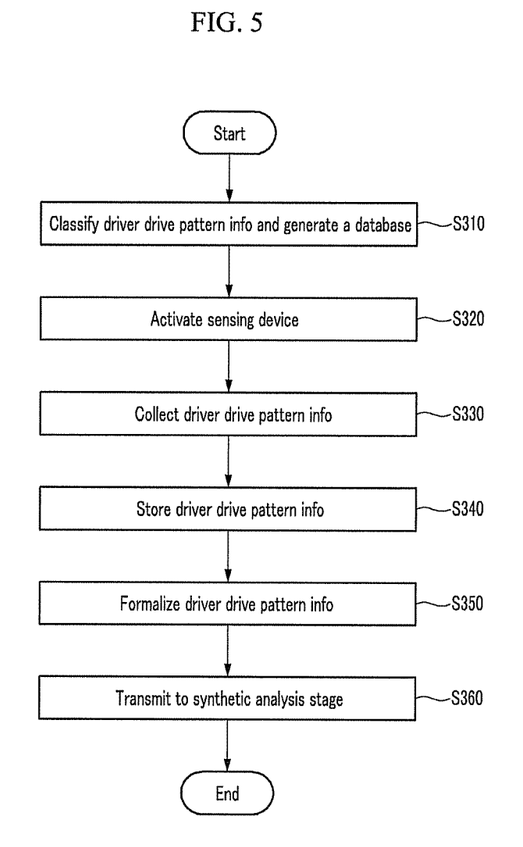
FIG. 5 shows a flowchart of a drive pattern information processing method according to an exemplary embodiment of the present invention.

FIG. 5 shows a flowchart of a drive pattern information processing method according to an exemplary embodiment of the present invention.

First, the drive pattern information processing device 300 classifies the driver's drive pattern information to store data including the driver's characteristics and the driver's drive history information (S310). Also, the drive pattern information processing device 300 activates the sensing device 20 inside or outside the vehicle for sensing the driver's drive pattern (S320), and uses the activated sensing device 20 to collect information of sensing the driver's drive pattern that is the driver's drive pattern information (S330).

The drive pattern information processing device 300 stores the collected driver's drive pattern information (S340), and converts the driver's drive pattern information into a formalized format (S350).

The drive pattern information processing device 300 transmits the formalized information to the cruise control speed analyzing device 400 in order to synthetically analyze it together with information respectively corresponding to the vehicle's inner and outer component state information and road state information (S360).

The exemplary embodiments of the present invention provide an environmentally-friendly/economical drive speed to increase usability for industries with reinforced global warming preventing agreements and exhaust gas reducing regulations. Further, an environmentally-friendly/economical cruise control system skill evolved from the conventional cruise control system focusing on convenience and safety can be provided.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cruise control method for a vehicle, comprising:
   collecting state information of components inside and outside the vehicle, state information of a road on which the vehicle is provided, and drive pattern information of a driver of the vehicle;
   obtaining mileage influences representing how each of the collected state information of the components, the road state information and the drive pattern information influences vehicle mileage amount and exhaust gas influences representing how each of them influence exhaust gas amount; and
   calculating, by a calculating device, a constant speed cruise control speed based on the mileage influences and the exhaust gas influences, and controlling the vehicle to run at the cruise control speed,
   wherein the cruise control speed is a speed that provides a highest mileage amount that is greater than a reference mileage amount and a lowest exhaust gas emission amount that is less than a reference exhaust gas emission amount.

2. The cruise control method of claim 1, wherein the controlling includes:
   allowing the vehicle to run at the cruise control speed to provide a mileage amount that is greater than the reference mileage amount; and
   allowing the vehicle to run at the cruise control speed to provide the exhaust gas emission amount that is less than the reference exhaust gas emission amount.

3. The cruise control method of claim 1, wherein state information of the components includes state information of tires and engine oil included to the vehicle.

4. The cruise control method of claim 1, wherein the road state information includes a green signal remaining time of a signal lamp on the road, and a road type.

5. The cruise control method of claim 1, wherein the drive pattern information includes a number of idling states and a number of acceleration and deceleration states per time during the vehicle driver's ride.

6. The cruise control method of claim 1, wherein the calculating of a cruise control speed includes displaying the calculated cruise control speed to the vehicle driver.

7. The cruise control method of claim 1, wherein the analyzing includes calculating and analyzing mileage influence indicating how each of the collected information influences the vehicle mileage amount and exhaust gas indicating how each of the collected information influences the exhaust gas emission amount based on the collected information.

8. A cruise control system comprising:
   a vehicle state information processing device configured to formalize vehicle information of a vehicle's inner and outer components;
   a road state information processing device configured to formalize road information of a road on which the vehicle is provided;
   a drive pattern information processing device configured to formalize drive information of a vehicle driver;
   an analyzing device configured to obtain mileage influences representing how each of the formalized vehicle, road and drive information influences vehicle mileage amount and exhaust gas influences representing how each of the formalized vehicle, road and drive information influences exhaust gas amount; and
   a calculating device configured to calculate a constant speed cruise control speed based on the analysis result by the analyzing device, and configured to control the vehicle's ride based on the cruise control speed,
   wherein the cruise control speed is a speed that provides a highest mileage amount that is greater than a reference mileage amount of the vehicle and a lowest exhaust gas emission amount that is less than a reference exhaust gas emission amount of the vehicle.

9. The cruise control system of claim 8, wherein the vehicle state information processing device includes:
   a sensor configured to sense states of the components inside or outside the vehicle;
   a collector for collecting state information of the vehicle's inner and outer components; and
   a processor configured to convert the collected state information of the vehicle's inner and outer components into a formalized format.

10. The cruise control system of claim 8, wherein the road state information processing device includes:
    a sensor configured to sense a state of the road on which the vehicle is currently provided;
    a collector configured to collect state information of the road; and
    a processor configured to convert the collected state information of the road into a formalized format.

11. The cruise control system of claim 8, wherein the drive pattern information processing device includes:
    a sensor configured to sense a drive pattern of the vehicle driver;
    a collector configured to collect the driver's drive pattern information; and
    a processor configured to convert the collected drive pattern information into a formalized format.

12. The cruise control system of claim 8, wherein the calculating device includes a display configured to display the calculated cruise control speed to a user.

13. The cruise control system of claim 8, wherein state information of the components includes state information of tires and engine oil included to the vehicle, the road state information includes a green signal remaining time of a signal lamp on the road and a road type, and the drive pattern information includes a number of idling states and a number of acceleration and deceleration states per time during the vehicle driver's ride.

14. The cruise control system of claim 8, wherein the analyzing device is further configured to calculate and analyze the exhaust gas influences indicating how each of the collected information influences the vehicle mileage amount and mileage influence indicating how each of the collected information influences the exhaust gas emission amount based on the collected information.

* * * * *